US006955399B2

(12) United States Patent
Hong

(10) Patent No.: US 6,955,399 B2
(45) Date of Patent: Oct. 18, 2005

(54) LUMBAR SUPPORT FOR CAR SEAT

(76) Inventor: Cheong Myung Hong, #1501-202 Seongjeo Village, 2115 Daehwa-dong, Ilsan-gu, Goyang-si, Gyeonggi-do (KR)

( * ) Notice: Subject to any disclaimer, the term of this patent is extended or adjusted under 35 U.S.C. 154(b) by 356 days.

(21) Appl. No.: 10/147,756

(22) Filed: May 16, 2002

(65) Prior Publication Data

US 2004/0160099 A1 Aug. 19, 2004

(30) Foreign Application Priority Data

Jan. 26, 2002 (KR) .................................. 2002-4644

(51) Int. Cl.$^7$ ................................................ A47C 7/46
(52) U.S. Cl. ................................................ 297/284.4
(58) Field of Search ...................................... 297/284.4

(56) References Cited

U.S. PATENT DOCUMENTS

| | | | | |
|---|---|---|---|---|
| 4,182,533 A | * | 1/1980 | Arndt et al. | 297/284.4 |
| 4,295,681 A | * | 10/1981 | Gregory | 297/284.4 |
| 5,518,294 A | * | 5/1996 | Ligon et al. | 297/284.4 |
| 6,270,158 B1 | * | 8/2001 | Hong | 297/284.4 |
| 6,334,651 B1 | * | 1/2002 | Duan et al. | 297/284.4 |
| 6,520,580 B1 | * | 2/2003 | Hong | 297/284.4 |
| 6,619,739 B2 | * | 9/2003 | McMillen | 297/284.4 X |
| 6,652,028 B2 | * | 11/2003 | McMillen | 297/284.4 |
| 6,652,029 B2 | * | 11/2003 | McMillen | 297/284.4 |
| 6,676,214 B2 | * | 1/2004 | McMillen et al. | 297/284.4 X |
| 6,758,522 B2 | * | 7/2004 | Ligon et al. | 297/284.4 |
| 2002/0195854 A1 | * | 12/2002 | Hong | 297/284.4 |
| 2003/0071501 A1 | * | 4/2003 | de Phinho et al. | 297/284.4 |
| 2003/0085599 A1 | * | 5/2003 | McMillen | 297/284.4 |
| 2004/0113472 A1 | * | 6/2004 | McMillen et al. | 297/284.4 |

* cited by examiner

Primary Examiner—Rodney B. White
(74) Attorney, Agent, or Firm—Porter, Wright, Morris & Arthur, LLP

(57) ABSTRACT

A lumbar support for a car seat includes a support element formed of a plate spring having a high elasticity to be positioned between traverse fixing bars which are mounted at upper and lower parts in a seat back for supporting a lumbar portion of a driver, and having a plurality of support wings formed at both sides and folded outwardly for surrounding the lumbar portion of the driver and a curved protrusion optionally formed in the center for supporting the lumbar portion of the driver, coupling units for coupling the support plate with the traverse fixing bars, a supporting height control element for steplessly controlling a protruded height of the support plate which is selectively and curvedly protruded at a side of the support plate, and a pelvic supporting element formed at a lower part of the support plate and connected to the support plate to contact and support hips of the driver, wherein the contact between the seat and the driver may be improved by forming the pelvic supporting element at the lower part of the support plate for stably supporting the lumber region and the pelvic region of the driver seating in the seat, so that it is possible to promote the safety driving by preventing the driver from being tired easily even in case of the long time driving, and to prevent the bad pose of the driver by the stable supporting of the lumbar region and the pelvic region of the driver, thereby maintaining the safety and the health of the driver.

5 Claims, 6 Drawing Sheets

LUMBAR SUPPORT FOR CAR SEAT

BACKGROUND OF THE INVENTION

1. Field of the Invention

The present invention relates to a lumbar support for a car seat to support lumbar and pelvic regions of a driver seating in a driver's seat of an automobile, and more particularly to a lumbar support in which a hip-supporting member is formed at a lower part of a support plate to improve the contact between the seat and the driver, thereby improving the comfort and releasing the stress loaded on the spine of the driver due to bad poses.

2. Description of the Related Art

In general, a driver's seat and its assistant seat are separated from each other by means of a console box, which is interposed therebetween in a car.

The seats are designed to absorb the impact applied from a road surface by proper support for providing comfort feeling, thereby reducing fatigue.

And, it is required for providing compact and economical design in view of the weight and the cost of the seats in the whole car.

Further conditions required in the car design are stationary ride comfort which makes it possible for a driver to take a stable pose when seated in the car, driving comfort considering the vibration characteristics of the seat while driving, that is, dynamic ride comfort, and holding capability for protecting the driver makes it possible for the driver to keep his stable pose when he turns or drives winding rods.

In the seats, a lumbar support is respectively mounted by being fixed to traverse fixing bars, and the lumbar support includes a support plate for supporting a lumbar region of the driver who seats in the driver's seat or a passenger who seats in the assistant seat and a control unit for controlling the support plate.

The lumbar support is to vary a force for supporting the lumbar region of the driver or the passenger in order to reduce the fatigue and keep the health of the driver or the passenger in case of a long timer driving.

Therefore, by means of the lumbar support, the driver or the passenger may be provided with the stationary ride comfort which makes the driver or the passenger to take a stable pose when seated in the car, the driving comfort considering the vibration characteristics of the seat while driving, that is, the dynamic ride comfort, and the holding capability for protecting the driver or the passenger to keep his stable pose when the driver turns or drives a car on winding rods.

A conventional lumbar support structured as above is mounted in a seat back and selectively curved and protruded for effectively supporting the lumbar region. However, the conventional lumbar support has a disadvantage that the curvedly protruded support plate may support only the lumbar region, so that the lumbar region may be applied with an overload.

That is, if the only lumbar region is supported, disc of the lumbar region is pushed due to the body structure of the driver in case of a long time driving, resulting in the stiffness of the lumbar region and the whole back.

In order to resolve the problem, the driver is apt to push his pelvic region forward in a bad pose, which causes an overload to a spine column of the driver.

When the driver keeps driving for a long time in the bad pose, diseases such as spondylolyses, various disc illness or scolioses may be caused.

The above problems are caused by the loss of stationary seating comfort which provides a good pose when the driver seats in the driver's seat finally, thereby losing the comfort, generating the fatigue and the drowsiness, threatening the safety of the driver.

SUMMARY OF THE INVENTION

Accordingly, the present invention is directed to a lumbar support for a car seat that substantially obviates one or more of the problems due to limitations and disadvantages of the prior art.

An object of the present invention is to provide a lumbar support for a car seat in which a hip-supporting element is formed at a lower part of a support plate for effectively supporting hip parts of a driver.

Another object of the present invention is to provide a lumbar support for a car seat which stably supports a lumbar region and a pelvic region of a driver who is seating in a driver's seat for improving the contact between the driver and the seat, thereby preventing the driver from being tired easily even while driving for a long time and improving the comfort feeling of the driver.

Still another object of the present invention is to provide a lumbar support for a car seat which stably supports a lumbar region and a pelvic of a driver with improved stability for preventing the bad pose of the driver who is seating in a driver's seat and protecting the driver from external impacts.

To achieve these and other advantages and in accordance with the purpose of the present invention, as embodied and broadly described, a lumbar support for a car seat includes a support element formed of a plate spring having a high elasticity to be positioned between traverse fixing bars which are mounted at upper and lower parts in a seat back for supporting a lumbar portion of a driver, and having a plurality of support wings formed at both sides and folded outwardly for surrounding the lumbar portion of the driver and a curved protrusion optionally formed in the center for supporting the lumbar portion of the driver, coupling units for coupling the support plate with the traverse fixing bars, a supporting height control element for steplessly controlling a protruded height of the support plate which is selectively and curvedly protruded at a side of the support plate, and a pelvic supporting element formed at a lower part of the support plate and connected to the support plate to contact and support hips of the driver.

Therefore, according to the present invention, the lumbar region and the pelvic region of the driver may be stably supported and the contact between the driver and the driver's seat may be improved, thereby preventing the driver from being tired easily even while driving for a long time and promoting the safe driving.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings.

DETAILED DESCRIPTION OF THE PREFERRED EMBODIMENTS

Reference will now be made in detail to a preferred embodiment of the present invention.

Figure 1:
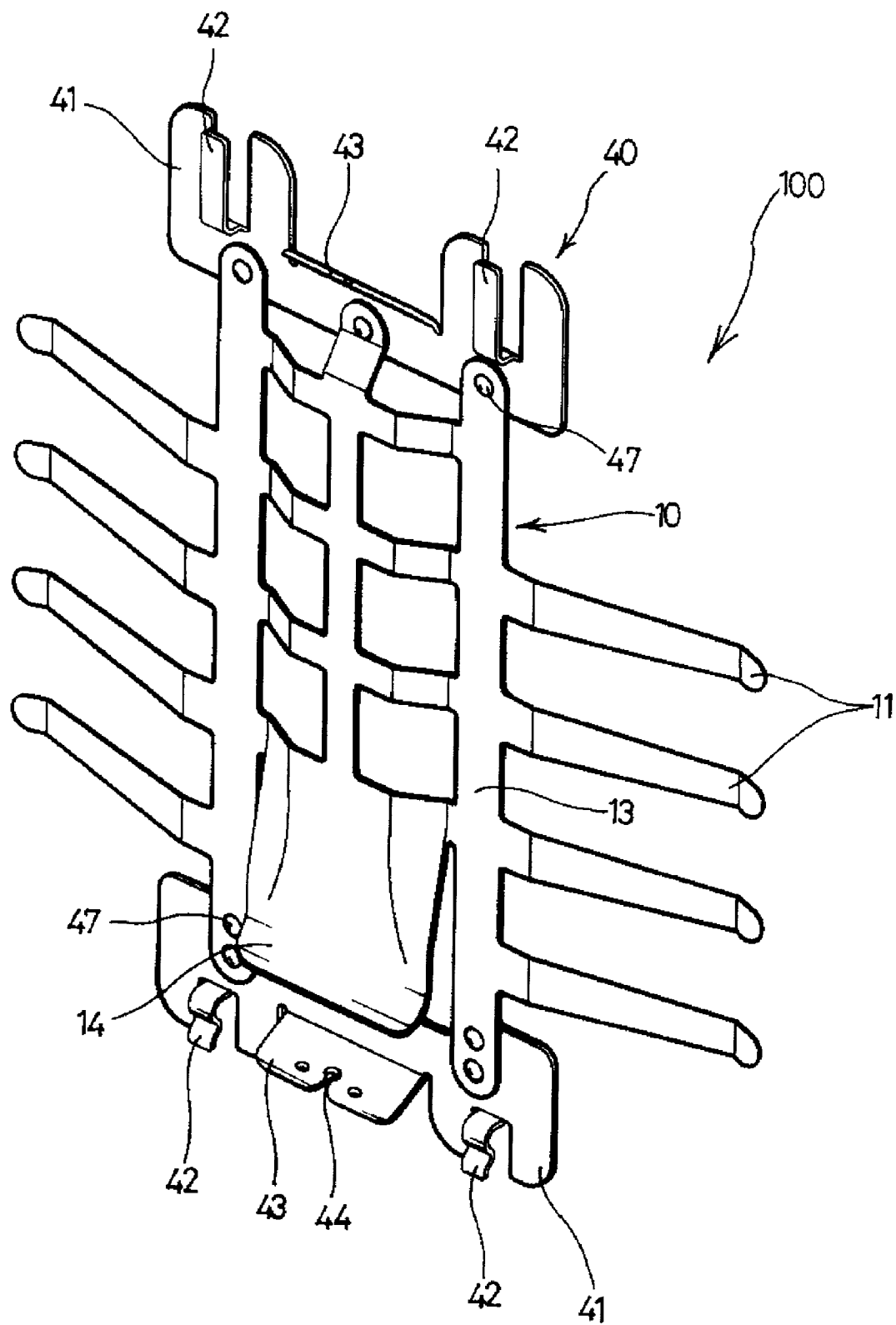
FIG. 1 is a perspective view showing a shape of a lumbar support according to the present invention.

FIG. 1 is a perspective view showing a shape of a lumbar support according to the present invention, in which a support plate is formed with a plurality of support wings and mounted with coupling units at both sides to be mounted with traverse fixing bars of a car seat.

Figure 2:
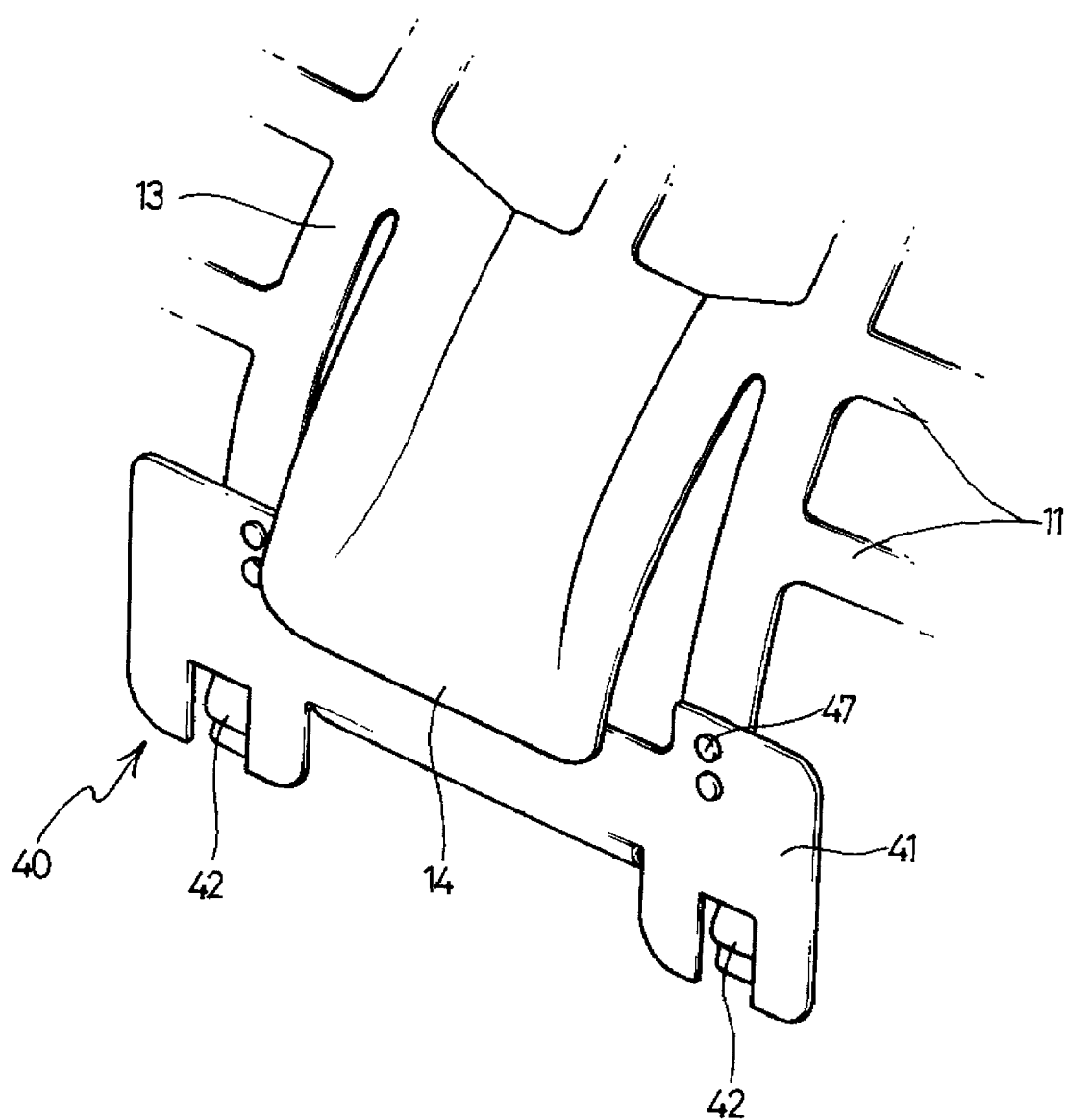
FIG. 2 is an expanded perspective view showing a pelvic supporting element of the lumbar support.

FIG. 2 is an expanded perspective view showing a shape of a pelvic supporting element of the lumbar support, which is formed at a lower part of the lumbar support for supporting a pelvic part of a driver seating in a driver's seat.

Figure 3:
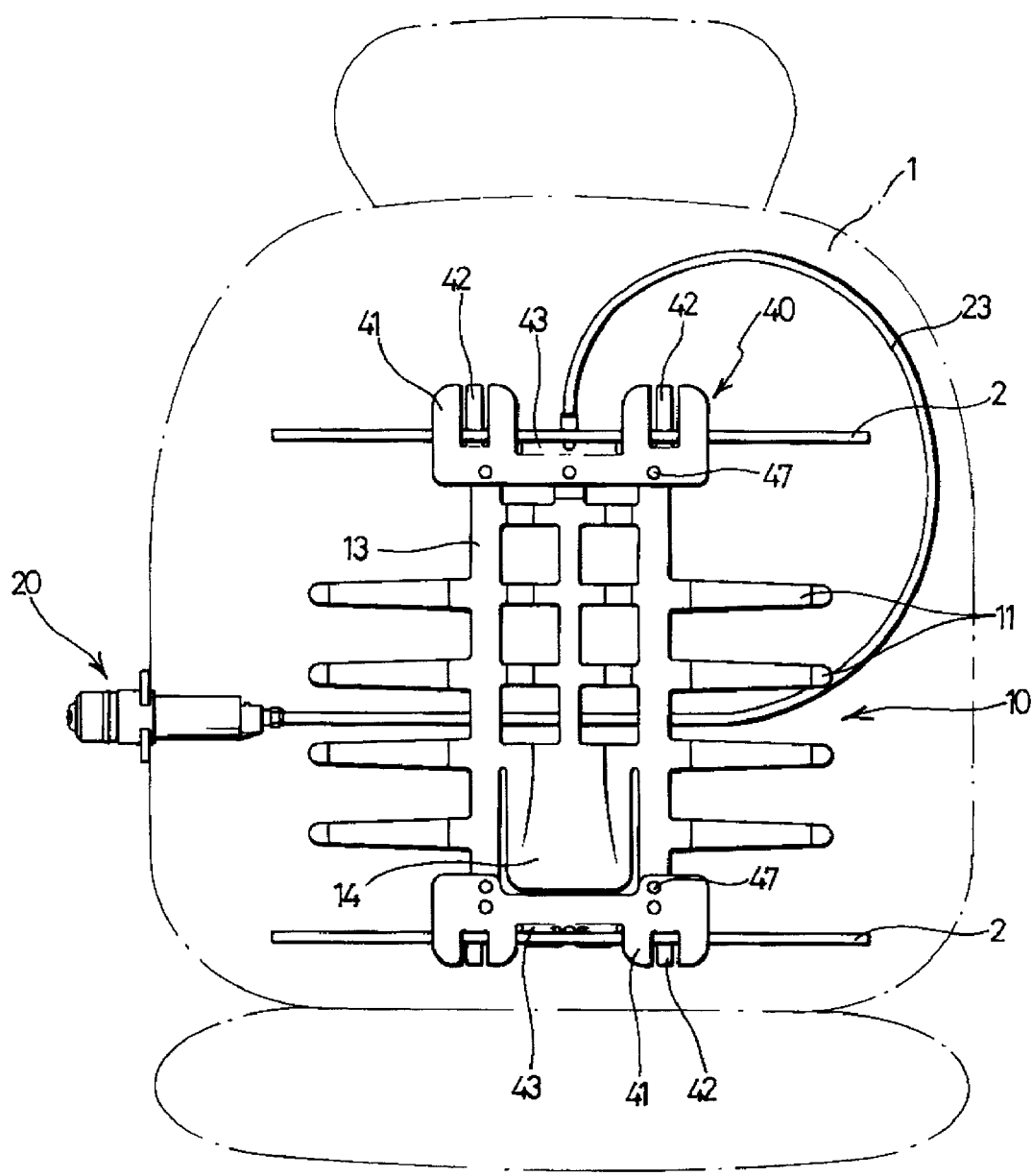
FIG. 3 is a front view showing the lumber support mounted to traverse fixing bars of a vehicle seat.

FIG. 3 is a front view showing a state that the lumber support is mounted to the traverse fixing bars of the vehicle seat, in which the lumbar support is fixed to the traverse fixing bars by being fitted into the fixing bars of the car seat and a supporting height control element is exposed to a side of a seat back.

Figure 4:
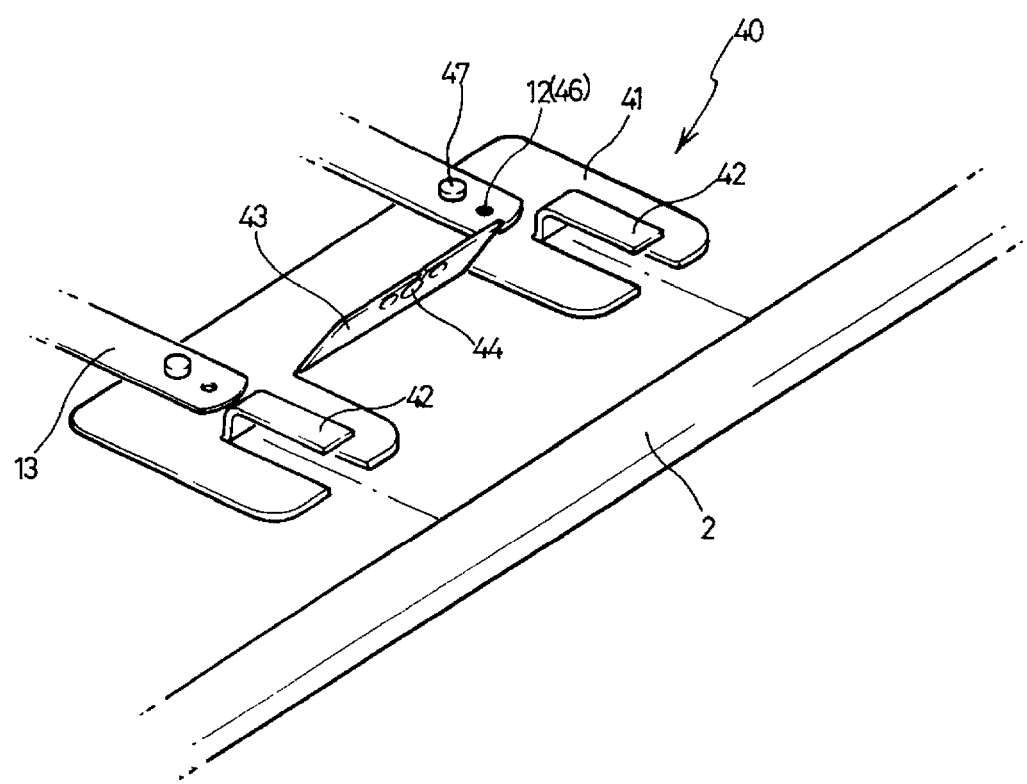
FIG. 4 is a perspective view showing coupling units coupled with the traverse fixing bars.

FIG. 4 is a perspective view showing a state that the coupling units are coupled with the traverse fixing bars, for explaining a coupling state between the fixing bars and the a coupling unit.

Figure 5:
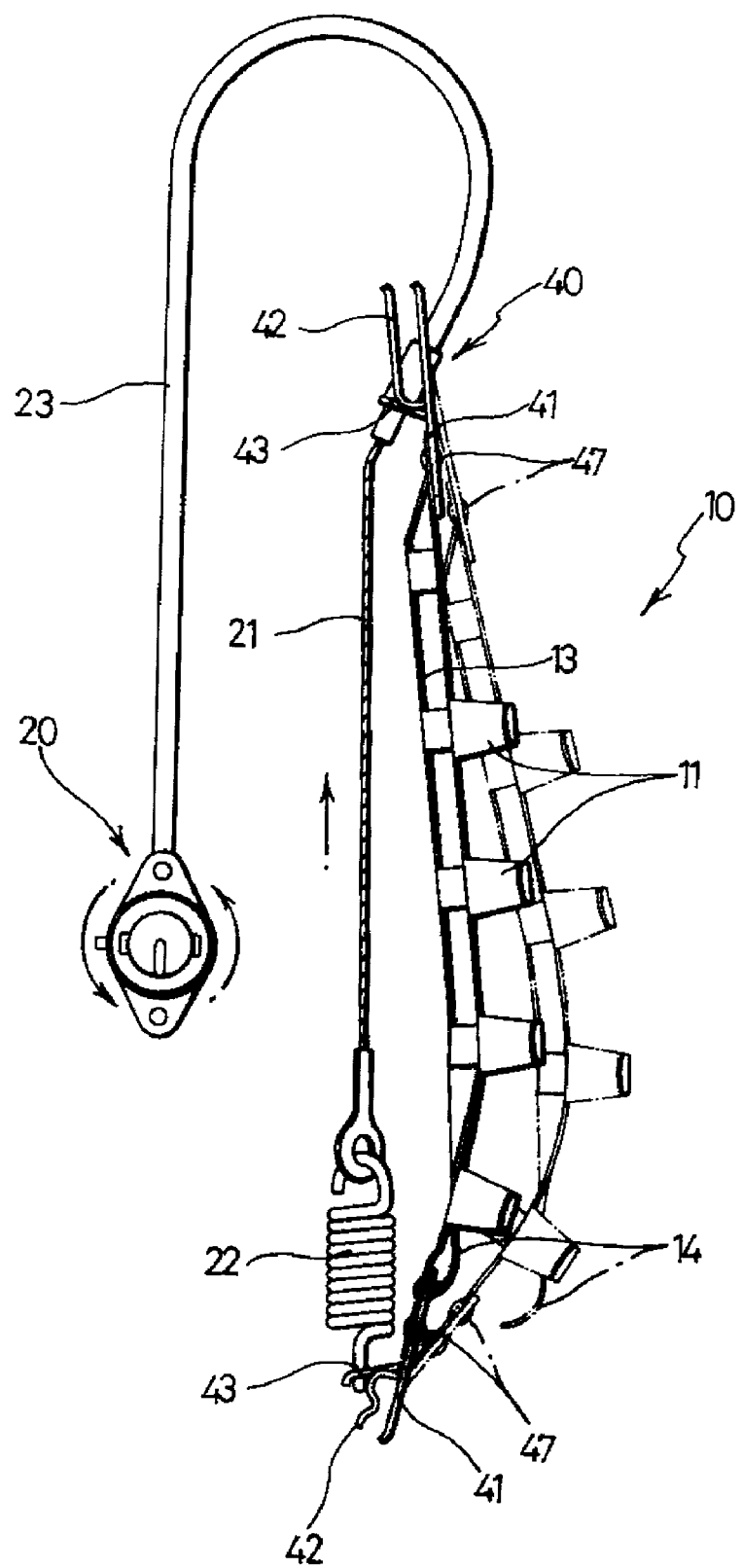
FIG. 5 is a side view showing an operation relationship between the lumbar support and a supporting height control element.

FIG. 5 is a side elevational view showing an operation relationship between the lumber support and the supporting height control element, in which the lumber support is curvedly protruded to a side by the operation of the supporting height control element.

Figure 6:
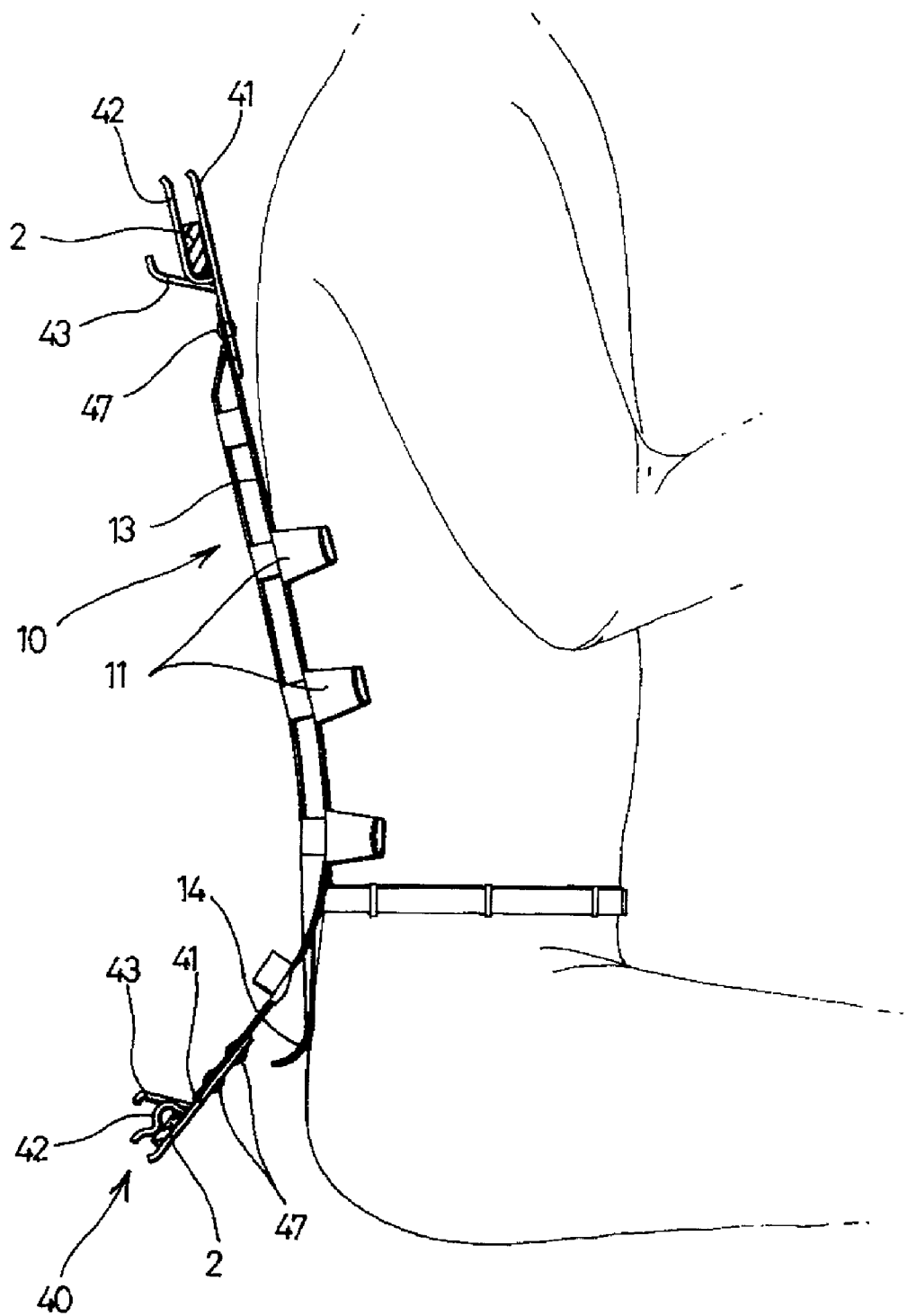
FIG. 6 is a side elevation view showing a lumbar support mounted according to another embodiment of the present invention.

FIG. 6 is a side elevational view showing a lumbar support mounted to a car seat according to another preferred embodiment of the present invention, in which a state that a pelvic region of a driver is supported by the lumbar support.

As shown in FIG. 1 and FIG. 2, according to the present invention, the lumbar support 100 may improve the comfort feeling of a driver by reducing the fatigue due to the long time driving and maintaining the good pose.

According to the present invention, the lumbar support includes a support element 10 for absorbing the impact or vibration with a plate spring element having good elasticity, coupling units 40 for mounting a support plate 13 to upper and lower traverse fixing parts 2 of a seat back 1, and a pelvic supporting element 14 formed at a lower part of the support plate 13 for supporting a pelvic region of a driver.

The support element 10 is formed with the plate spring element of a high elasticity and formed with a plurality of support wings 11 for surrounding and supporting a lumbar region of the driver.

The coupling units 40 for coupling the support plate 13 to the upper and lower traverse fixing bars 2 of the seat back 1 includes, as shown in FIG. 3, coupling plates 41 to be coupled with the support plate 13, wherein the coupling plates 41 may be integrally formed with the support plate 13.

In case that the coupling plates 41 are separately made due to complicated molds, the support plate 13 is formed with connection grooves 12 and the coupling plates 41 are formed mounting grooves 46 corresponding to the connection grooves 12 of the support plate 13, so that connection elements 47 such as rivets or bolts are inserted into the connection grooves and the mounting grooves commonly, thereby firmly attaching the coupling plates 41 to the support plate 13.

The coupling plates 4 are, as shown in FIG. 4, formed in the flat rectangular shape of a predetermined thickness with a plate spring of a high elasticity and a high strength, and fixed to the upper and lower parts of the support plate 13 by the connection elements 47. Further, the coupling plates 4 are respectively formed with a coupling clip 42 in the center of a body part, wherein the coupling clips 42 are folded to have a gap between unfolded side parts of the coupling plates.

At this time, the gap between the coupling grips 42 and the coupling plate 41 is formed equal to or smaller than a thickness of the traverse fixing bars 2, and the coupling clips 42 have elasticity between the coupling elements 41.

Therefore, as the traverse fixing bars 2 are fitted into the gap between the coupling plates 41 and the coupling clips 42, it becomes possible to resolve the problem that the lumbar support 100 itself is deviated from the traverse fixing bars 2 by the vibration or the impact of the car.

The coupling units 40 including the coupling plates 41 and the coupling clips 42, are formed symmetrically in the same structure at the upper and lower parts of the support plate 13, in order to prevent the lumbar support 100 from being deviated from the traverse fixing parts 2 due to a load of the driver or the impact which is applied from the outside, after the lumbar support 100 is mounted to the traverse fixing bars 2.

The coupling units 40 further include connection plates 43 which are folded inwardly in the center part with a predetermined inclination angle and formed with coupling grooves 44 at lower parts.

The connection plates 43 fix an end of a cable 23 which surrounds a wire element 21 when the support element 10 is curvedly protruded by the manipulation of the supporting height control element 20, wherein the wire element 21 passes through the coupling grooves 44.

Further, a spring element 22 is mounted between the wire element 21 and the connection plate 43 which is mounted at the lower part of the support element 10 and elastically maintains the wire element 21 as pulled.

Therefore, as shown in FIG. 5, if the support element 10 is selectively protruded by being curved in association with stepless control of the supporting height control element 20, the support plate 13 supports the lumbar part of the driver while the support wings 11 are curved and surrounding the lumbar region of the driver seating in the driver's seat, so that the driver may keep the good pose.

On the other hand, as the support plate 13 is curvedly protruded to a side and supports the lumbar region of the driver, the pelvic region of the driver is pushed outwardly, resulting in a slightly bent pose of the driver.

If the driver keeps driving for a long time in the bent pose, the spine of the driver is applied with an overload, causing diseases such as the stiffness or the scolioses.

In order to prevent such symptoms, it is preferable to support the lumber region simultaneously with the pelvic region in which the coccyes of the spinal column.

Therefore, as shown in FIG. 2, the pelvic supporting element 14 is formed at a lower center part of the support plate 13 for supporting the pelvic region of the driver who is seating in the driver's seat.

The pelvic supporting element 14 is formed of a plate spring having a good elasticity, wherein both upper ends of the pelvic supporting element 14 are connected to the support plate 13 and a free lower end for maintaining a predetermined protrusion angle even when the support plate 13 is curvedly protruded to a side by the manipulation of the supporting height control element 20.

Further, the lower end part of the pelvic supporting element 14 is curved inwardly for surrounding the pelvic region of the driver and preventing the generation of pain in a contact portion of the driver when the pelvic region of the driver is contacting the pelvic supporting element for a long time.

It is preferable to form the pelvic supporting element 14 integrally with the support plate 13, but not limited thereto. It is also possible to form the pelvic support element 14 separately according to the manufacturing conditions.

As shown in FIG. 6, if the supporting height control element 20 is steplessly controlled according to a body condition of the driver after the driver seats in the driver's seat, the support plate 13 becomes curvedly protruded to a side for supporting the lumber region of the driver, and the pelvic supporting element 14 surrounds and supports the pelvic region of the driver.

At this time, the pelvic supporting element 14 is connected to the support plate 13 only at both upper ends and the lower free end maintains the protrusion state of the pelvic supporting element 14 uniformly regardless of whether the support plate is curved or not by the supporting height control element 20.

Finally, the lumbar region and the pelvic region of the driver may be simultaneously supported by the curvedly protruded support plate 13 and the pelvic supporting element 14, so that the driver may keep the good pose in the seat, thereby improving the stationary seating feeling and the contact between the seat and the driver.

Therefore, it is possible to provide the driver with safety driving and the health keeping conditions by the reduction of the fatigue due to the driving for a long time.

According to the present invention structured as above, the contact between the seat and the driver may be improved by forming the pelvic supporting element at a lower part of the support plate for stably supporting the lumber region and the pelvic region of the driver seating in the seat.

Further, it is possible to promote the safety driving by preventing the driver from being tired easily even in case of the long time driving, and to prevent the bad pose of the driver by the stable supporting of the lumbar region and the pelvic region of the driver, thereby maintaining the safety and the health of the driver.

It will be apparent to those skilled in the art that various modifications and variations can be made to the device of the present invention without departing from the spirit and scope of the invention. The present invention covers the modifications and variations of this invention provided they come within the scope of the appended claims and their equivalents.

What is claimed is:

1. A lumbar support of a car seat comprising:

a support element formed of a support plate having a high elasticity to be positioned between upper and lower transverse fixing bars which are mounted at upper and lower parts in a seat back for supporting a lumbar portion of a driver, and having a plurality of support wings formed at both sides and folded outwardly for surrounding the lumbar portion of the driver and a curved protrusion optionally formed in the center for supporting the lumbar portion of the driver;

coupling units for coupling the support plate with the transverse fixing bars;

a supporting height control element for steplessly controlling a protruded height of the support plate which is selectively and curvedly protruded at a side of the support plate; and a pelvic supporting element formed at a lower part of the support plate and having an upper end integrally formed with the support plate and a free lower end formed at a predetermined angle of protrusion to support hips of the driver whereby the support plate and the pelvic supporting element simultaneously support the lumbar portion and the hips of the driver respectively when the curved protrusion is formed in the center of the support plate to support the lumbar portion of the driver;

wherein the pelvic supporting element is spaced apart from and located between the upper and lower transverse fixing bars so that the free lower end of the pelvic supporting element moves toward the driver to engage the hips of the driver when the curved protrusion is formed in the center of the support plate.

2. A lumbar support of a car as claimed in claim 1, wherein the pelvic supporting element is in the form of an elastic plate spring.

3. A lumbar support of a car as claimed in claim 1, wherein the predetermined protrusion angle is maintained even when the support plate is curvedly protruded by manipulation of the supporting height control element.

4. A lumbar support of a car as claimed in claim 1, wherein the lower free end maintains the protrusion state of the pelvic supporting element uniformly regardless of whether the support plate is curvedly protruded for supporting the lumbar region or not.

5. A lumbar support of a car as claimed in claim 1, wherein the free lower end of the pelvic supporting element remains cantilevered to engage the hips of the driver when the curved protrusion is formed in the center of the support plate to support the lumbar portion of the driver.

* * * * *